United States Patent
Matsuda

(10) Patent No.: US 7,454,395 B2
(45) Date of Patent: Nov. 18, 2008

(54) INFORMATION PROCESSING APPARATUS AND PROGRAM FOR DISPLAYING TREE DIAGRAM

(75) Inventor: Tadashi Matsuda, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 251 days.

(21) Appl. No.: 11/403,754

(22) Filed: Apr. 13, 2006

(65) Prior Publication Data
US 2006/0242090 A1 Oct. 26, 2006

(30) Foreign Application Priority Data
Apr. 22, 2005 (JP) ............... 2005-125130

(51) Int. Cl.
*G06N 5/02* (2006.01)
(52) U.S. Cl. ............... 706/46; 715/762; 345/214; 700/95
(58) Field of Classification Search ............... 706/12, 706/18, 45–48, 55; 715/204, 214, 215, 231, 715/233–235, 255, 267, 762, 763, 782, 853, 715/855; 345/428, 581, 595, 619–621, 630, 345/440, 530, 204, 214; 700/17, 28–31, 700/95–100, 104, 107
See application file for complete search history.

(56) References Cited

U.S. PATENT DOCUMENTS

| | | | |
|---|---|---|---|
| 4,591,983 A * | 5/1986 | Bennett et al. ............... | 706/53 |
| 5,523,960 A * | 6/1996 | Jeong ............... | 703/6 |
| 5,644,740 A * | 7/1997 | Kiuchi ............... | 715/853 |
| 6,223,094 B1 * | 4/2001 | Muehleck et al. ............ | 700/107 |
| 6,557,002 B1 | 4/2003 | Fujieda et al. | |
| 6,868,525 B1 * | 3/2005 | Szabo ............... | 715/738 |
| 7,076,736 B2 * | 7/2006 | Hugh ............... | 715/743 |
| 2004/0150644 A1 * | 8/2004 | Kincaid et al. ............... | 345/440 |
| 2005/0262452 A1 * | 11/2005 | Sauermann ............... | 715/853 |
| 2006/0085765 A1 * | 4/2006 | Peterson et al. ............ | 715/853 |

FOREIGN PATENT DOCUMENTS

| | | |
|---|---|---|
| JP | 2000-339381 | 12/2000 |
| JP | 2001-142929 | 5/2001 |

* cited by examiner

*Primary Examiner*—David Vincent
*Assistant Examiner*—Omar F Fernandez Rivas
(74) *Attorney, Agent, or Firm*—Blakely, Sokoloff, Taylor & Zafman LLP

(57) ABSTRACT

According to one embodiment, an information processing apparatus includes a memory unit which stores attribute information which indicates a characteristic quantity of each of components constituting a product, and parent-child relationship information which indicates a parent-child relationship between the components, a unit which calculates positions on a tree diagram of nodes corresponding to the components, a unit which calculates, for each of the components, a sum of the characteristic quantity of the component and the characteristic quantities of all child components belonging to the component, a unit which determines, for each of the nodes, a mode of a branch line which is to connect the node to a parent node thereof, based on the sum calculated for each of the components, and a unit which creates the tree diagram based on the calculated positions of the nodes and the determined mode of the branch line corresponding to each node.

19 Claims, 4 Drawing Sheets

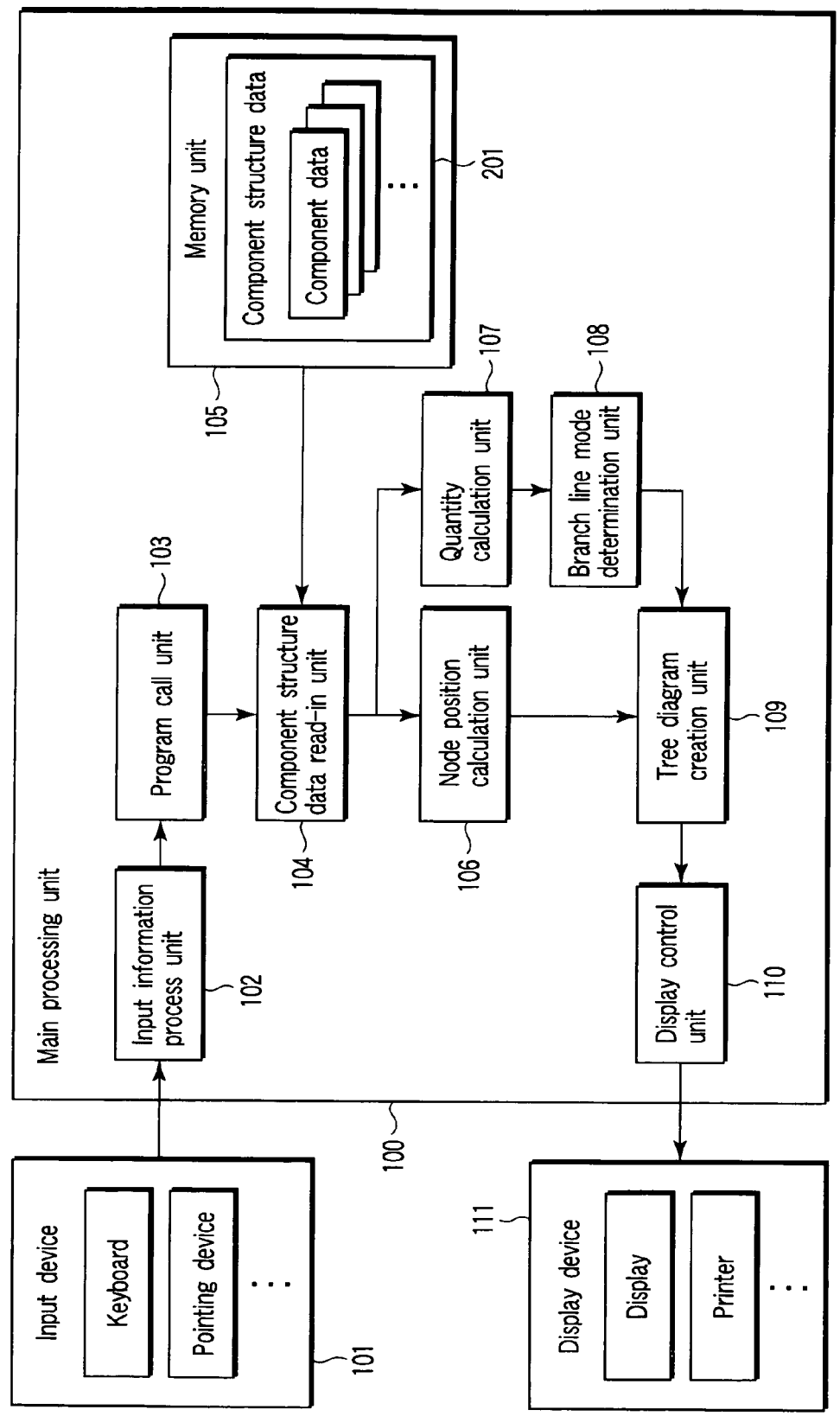
F I G. 1

Component structure data 201
| Name | Code | Parent name | Parent code | Weight [g] | Cost [$] |
|---|---|---|---|---|---|
| Component 1 | A 1 | Product | A | — | 500 |
| Component 2 | A 2 | Product | A | 3.5 | 200 |
| Component 1.1 | A 3 | Component 1 | A 1 | 5.0 | 50 |
| Component 1.2 | A 4 | Component 1 | A 1 | 2.0 | 100 |
F I G. 2
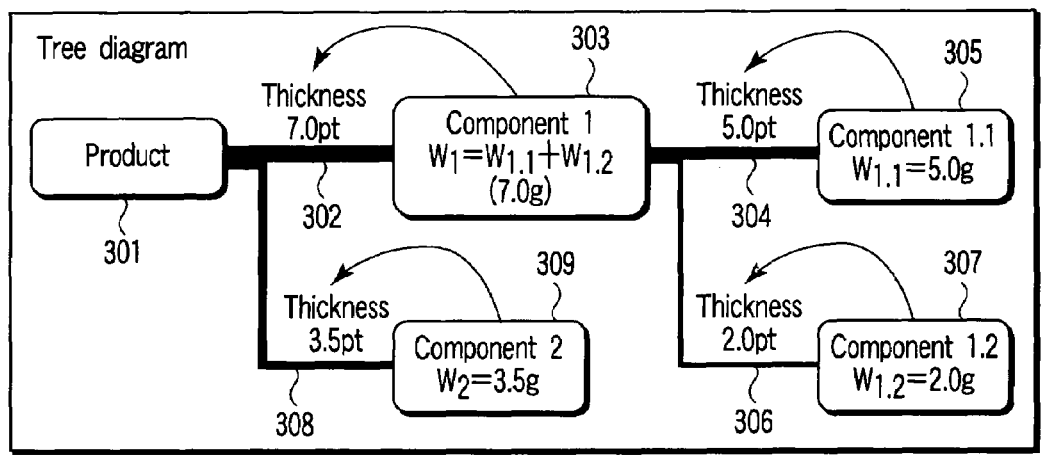
F I G. 3
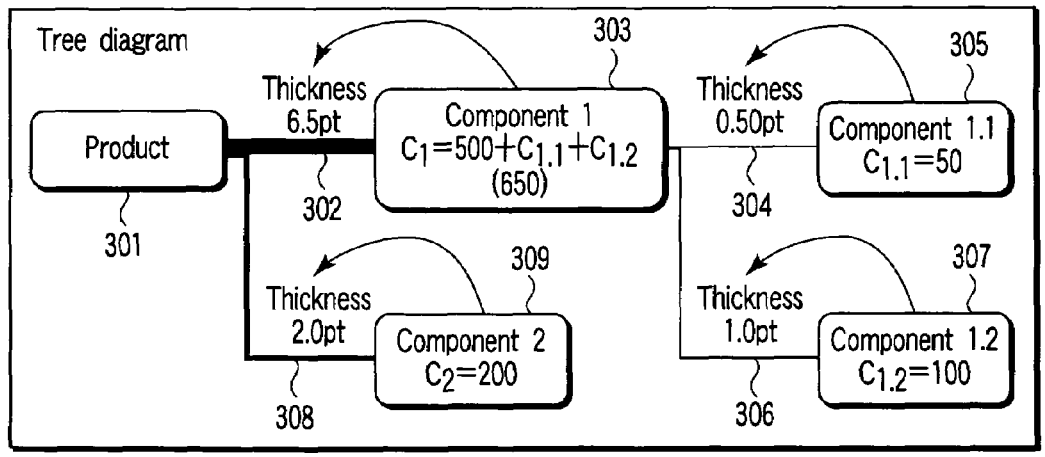
F I G. 4

INFORMATION PROCESSING APPARATUS AND PROGRAM FOR DISPLAYING TREE DIAGRAM

CROSS-REFERENCE TO RELATED APPLICATIONS

This application is based upon and claims the benefit of priority from Japanese Patent Application No. 2005-125130, filed Apr. 22, 2005, the entire contents of which are incorporated herein by reference.

BACKGROUND

1. Field

One embodiment of the invention relates to an information processing apparatus and a program, which can display a tree diagram that represents, in a tree form, a hierarchical structure of components that constitute a product.

2. Description of the Related Art

In general, a product, such as a personal computer, a TV or a video recorder, needs to be designed in consideration of the total weight, total cost, total content of chemical substances, etc. of the product.

Thus, there is a demand for a system that manages characteristic quantities (e.g. weight, cost, chemical substance content) which are inherent to the respective components of a designed product.

Jpn. Pat. Appln. KOKAI Publication No. 2001-142929 discloses a system which displays components of a product in a tree form.

In the system of KOKAI No. 2001-142929, however, the tree merely displays the hierarchical structure of the components of the product, and cannot display how the components influence the weight, cost, chemical substance content, etc. of the whole product.

It is thus necessary to realize a novel function for graphically displaying, at the same time, the hierarchical structure of components of a product and the degree of contribution of the components to the whole product.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is a block diagram that shows an example of the system configuration of an information processing apparatus according to an embodiment of the invention;

FIG. 2 shows an example of component structure data that is used in the information processing apparatus shown in FIG. 1;

FIG. 3 shows an example of a tree diagram that is displayed by the information processing apparatus shown in FIG. 1;

FIG. 4 shows another example of a tree diagram that is displayed by the information processing apparatus shown in FIG. 1;

DETAILED DESCRIPTION

Figure 5:
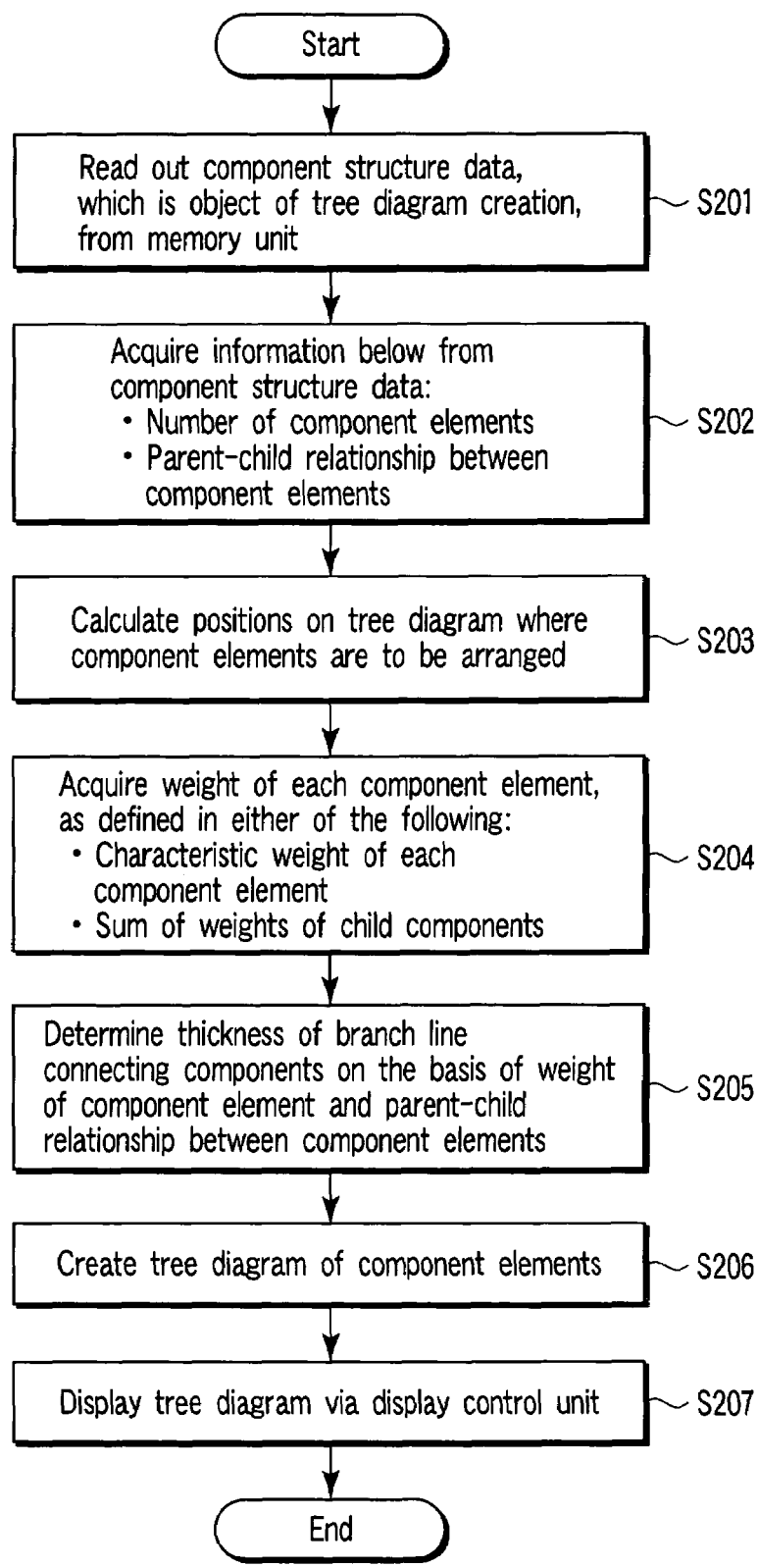
FIG. 5 is a flow chart illustrating an example of the procedure of a tree diagram creation process, which is executed by the information processing apparatus shown in FIG. 1.

Various embodiments according to the invention will be described hereinafter with reference to the accompanying drawings. In general, according to one embodiment of the invention, an information processing apparatus displays a tree diagram that represents, in a tree form, a hierarchical structure of a plurality of components which constitute a product. The information processing apparatus includes a memory unit which stores attribute information which indicates a characteristic quantity of each of the plurality of components, and parent-child relationship information which indicates a parent-child relationship between the plurality of components, means for calculating, based on the parent-child relationship information, positions on the tree diagram where a plurality of nodes corresponding to the plurality of components are to be arranged, means for calculating, for each of the components, a sum of the characteristic quantity of the component and the characteristic quantities of all child components belonging to the component, based on the attribute information and the parent-child relationship information, means for determining, for each of the nodes on the tree diagram, a mode of a branch line which is to connect the node to a parent node thereof, based on the sum calculated for each of the components, and means for creating the tree diagram based on the calculated positions of the nodes and the determined mode of the branch line corresponding to each node.

According to an embodiment, FIG. 1 is a block diagram that shows the system configuration of an information processing apparatus according to an embodiment of the invention. This information processing apparatus is a computer which displays a tree diagram that represents, in a tree form, a hierarchical structure of components that constitute a product. In the tree diagram, the components are expressed as nodes, and the parent-child relationship between the components is expressed by branch lines that connect the nodes corresponding to the components.

The computer includes a main processing unit 100, an input device 101 and a display device 111. The input device 101 is a device for inputting various data and operational instructions. The input device 101 is composed of a keyboard, a pointing device, etc. The display device 111 is a device which displays a tree diagram that is created by the main processing unit 100. The display device 111 is composed of a display monitor, a printer, etc.

The main processing unit 100 includes a CPU and executes an arithmetic process for automatically creating a tree diagram, which corresponds to a product designated by the input device 101. The main processing unit 100 comprises an input information process unit 102, a program call unit 103, a component structure data read-in unit 104, a memory unit 105, a node position calculation unit 106, a quantity calculation unit 107, a branch line mode determination unit 108, a tree diagram creation unit 109 and a display control unit 110.

The memory unit 105 is a storage device which stores component structure data 201. The component structure data 201 includes attribute information which indicates characteristic quantities (e.g. weight, cost, and chemical substance content) of components of a product, and parent-child relationship information which indicates a parent-child relationship between the components. The parent-child relationship between components indicates a relationship between a given component and child component elements that constitute the given component. In the component structure data 201, the parent-child relationship between components is defined under the restrictive condition that one child component element does not have a plurality of parent component elements.

The component structure data 201 is composed of a plurality of component data corresponding to a plurality of components that constitute a product. The memory unit 105 stores a plurality of component structure data 201 corresponding to a plurality of products.

The input information process unit 102 receives input data and operational instructions from the input device 101. For example, the input data from the input device 101 designates component structure data 201 relating to a specific product, and the operational instruction from the input device 101 instructs creation of a tree diagram. The input information process unit 102 sends the input data and operational instruction from the input device 101 to the program call unit 103.

The program call unit 103 calls a tree diagram creation program, and delivers a parameter, which indicates the component structure data 201 designated by the input data, to the tree diagram creation program as an argument. The tree diagram creation program is executed by the CPU of the main processing unit 100. The tree diagram creation program includes, as its functional modules, the component structure data read-in unit 104, node position calculation unit 106, quantity calculation unit 107, branch line mode determination unit 108 and tree diagram creation unit 109.

The component structure data read-in unit 104 reads out the component structure data 201, which is designated by the parameter, from the memory unit 105, and delivers the read-out component structure data 201 to the node position calculation unit 106 and quantity calculation unit 107. Based on the parent-child relationship information included in the component structure data 201, the node position calculation unit 106 calculates positions on a tree diagram where a plurality of nodes corresponding to a plurality of components that constitute the product are to be arranged. Based on the parent-child relationship information and attribute information included in the component structure data 201, the quantity calculation unit 107 calculates, with respect to each of components, a sum of a characteristic quantity of the component and characteristic quantities of all child components belonging to the component.

Based on the sum that is calculated for each component, the branch line mode determination unit 108 determines, with respect to each of the nodes on the tree diagram, the mode (line type, line color, etc.) of a branch line that connects the node to its parent node. For instance, the line width, color or line type (e.g. solid line, wavy line or broken line) of the branch line is used as the mode of the branch line. For example, when the line width is used as the mode of the branch line, the branch line mode determination unit 108 determines the line width of the branch line that connects the node corresponding to the component and the node of its parent, on the basis of the sum corresponding to the associated components. In this case, the greater the sum of quantities of the components, the greater the line width of the branch line.

The tree diagram creation unit 109 creates a tree diagram on the basis of the positions of the nodes, which are calculated by the node position calculation unit 106, and the mode of the branch line corresponding to each node, which is determined by the branch line mode determination unit 108. The display control unit 110 executes a process for displaying on the display the tree diagram that is created by the tree diagram creation unit 109. The display control unit 110 can also print out the tree diagram, which is created by the tree diagram creation unit 109, via the printer.

FIG. 2 shows an example of the component structure data 201.

The component structure data 201 comprises a plurality of records corresponding to the components that constitute the product. Each record stores component data that relates to the component corresponding to the record. Each record comprises a name field, a code field, a parent name field, a parent code field, a weight field, and a cost field.

Assume now that the product is composed of four components, i.e. component 1, component 2, component 1.1 and a component 1.2, and that the component 1 is composed of two component elements, i.e. component 1.1 and component 1.2. The component structure data 201 includes four records corresponding to the four components, i.e. component 1, component 2, component 1.1 and a component 1.2.

As regards the record corresponding to the component 1, the name "COMPONENT 1" of the component 1 is stored in the name field, and the code "A1" of the component 1 is stored in the code field. Since the parent of the component 1 is the product, the name "PRODUCT" of the product is stored in the parent name field, and the code "A" of the product is stored in the parent code field. As characteristic quantities of the component 1, the quantities indicating the weight of the component 1 and the cost (component cost, assembly cost, personnel cost) of the component 1 are stored in the weight field and cost field.

As regards the record corresponding to the component 2, the name "COMPONENT 2" of the component 2 is stored in the name field, and the code "A2" of the component 2 is stored in the code field. Since the parent of the component 2 is the product, the name "PRODUCT" of the product is stored in the parent name field, and the code "A" of the product is stored in the parent code field. As characteristic quantities of the component 2, the quantities indicating the weight of the component 2 and the cost of the component 2 are stored in the weight field and cost field.

As regards the record corresponding to the component 1.1, the name "COMPONENT 1.1" of the component 1.1 is stored in the name field, and the code "A3" of the component 1.1 is stored in the code field. Since the parent of the component 1.1 is the component 1, the name "COMPONENT 1" of the component 1 is stored in the parent name field, and the code "A1" of the component 1 is stored in the parent code field. As characteristic quantities of the component 1.1, the quantities indicating the weight of the component 1.1 and the cost of the component 1.1 are stored in the weight field and cost field.

As regards the record corresponding to the component 1.2, the name "COMPONENT 1.2" of the component 1.2 is stored in the name field, and the code "A4" of the component 1.2 is stored in the code field. Since the parent of the component 1.2 is the component 1, the name "COMPONENT 1" of the component 1 is stored in the parent name field, and the code "A1" of the component 1 is stored in the parent code field. As characteristic quantities of the component 1.2, the quantities indicating the weight of the component 1.2 and the cost of the component 1.2 are stored in the weight field and cost field.

FIG. 3 shows a first example of a tree diagram that is created by the main processing apparatus 100 on the basis of the component structure data 201 shown in FIG. 2. In the tree diagram shown in FIG. 3, the line widths of the branch lines are determined in accordance with characteristic quantities of the components. Weight is used as a characteristic quantity of each component.

A node 301, a node 303, a node 305, a node 307 and a node 309 correspond to the product, component 1, component 1.1, component 1.2 and component 2, respectively. The line width of a branch line 304, which connects the node 305 corresponding to the component 1.1 and the node 303 corresponding to the component 1, is determined in accordance with the weight (5.0 g) of the component 1.1, and is set at, e.g. 5.0 points (pt). The line width of a branch line 306, which connects the node 307 corresponding to the component 1.2 and the node 303 corresponding to the component 1, is determined in accordance with the weight (2.0 g) of the component 1.2, and is set at, e.g. 2.0 points.

The line width of a branch line 302, which connects the node 303 corresponding to the component 1 and the node 301 corresponding to the product, is determined in accordance with the sum of the weight of the component 1 and the weights of all child components (component 1.1 and component 1.2) of the component 1. In this case, since the weight of the component 1 is zero, the sum of the weights corresponding to the component 1 is the sum (7.0 g) of the weight (5.0 g) of the component 1.1, the weight (2.0 g) of the component 1.2 and the weight (0 g) of the component 1. Accordingly, the line width of the branch line 302 is set at, e.g. 7.0 points.

The line width of a branch line 308, which connects the node 309 corresponding to the component 2 and the node 301 corresponding to the product, is determined in accordance with the weight (3.5 g) of the component 2, and is set at, e.g. 3.5 points.

In the tree diagram shown in FIG. 3, the degrees of contribution of the respective components to the weight of the whole product are graphically displayed by the thickness of branch lines. In this case, the line width of each branch line is determined by taking into account not only the weight of each component but also the weights of child components. The user can thus easily understand, from the tree diagram, which group of components influences the weight of the whole product, and to what degree such a group of components influences the weight of the whole product.

FIG. 4 shows a second example of a tree diagram that is created by the main processing apparatus 100 on the basis of the component structure data 201 shown in FIG. 2. In the tree diagram shown in FIG. 4, the line widths of the branch lines are determined in accordance with characteristic quantities of the components. Cost is used as a characteristic quantity of each component.

The line width of a branch line 304, which connects the node 305 corresponding to the component 1.1 and the node 303 corresponding to the component 1, is determined in accordance with the cost (50 $) of the component 1.1, and is set at, e.g. 0.5 point. The line width of a branch line 306, which connects the node 307 corresponding to the component 1.2 and the node 303 corresponding to the component 1, is determined in accordance with the cost (100 $) of the component 1.2, and is set at, e.g. 1.0 point.

The line width of a branch line 302, which connects the node 303 corresponding to the component 1 and the node 301 corresponding to the product, is determined in accordance with the sum of the cost of the component 1 and the costs of all child components (component 1.1 and component 1.2) of the component 1. In this case, since the cost of the component 1 is 500 $, the sum of the costs corresponding to the component 1 is the sum (650 $) of the cost (50 $) of the component 1.1, the cost (100 $) of the component 1.2 and the cost (500 $) of the component 1. Accordingly, the line width of the branch line 302 is set at, e.g. 6.5 points.

The line width of a branch line 308, which connects the node 309 corresponding to the component 2 and the node 301 corresponding to the product, is determined in accordance with the cost (200 $) of the component 2, and is set at, e.g. 2.0 points.

In the tree diagram shown in FIG. 4, the degrees of contribution of the respective components to the cost of the whole product are graphically displayed by the thickness of branch lines. In this case, the line width of each branch line is determined by taking into account not only the cost of each component but also the costs of child components. The user can thus easily understand, from the tree diagram, which group of components influences the cost of the whole product, and to what degree such a group of components influences the cost of the whole product.

As the mode of the branch line, not only the line width but also the density of color, for instance, can be used. In this case, a branch line, which corresponds to a component with a greater weight (or higher cost), has a color of a higher density. Besides, in accordance with the weight (or cost, etc.), the kind of branch line (dotted line, broken line, chain line, double line, wavy line) may be altered.

Next, referring to a flow chart of FIG. 5, a description is given of a specific procedure of the tree diagram creation process, which is executed by the main processing unit 100. It is assumed that weight is used as a characteristic quantity of each component, and a line width of a branch line is used as the mode of the branch line.

The main processing unit 100 reads out of the memory unit 105 the component structure data 201 relating to a product that is an object of the tree diagram creation process (block S201). From the read-out component structure data 201, the main processing unit 100 acquires information relating to the number of components (component elements) constituting the product, and information relating to the parent-child relationship between the components (block S202).

In order to determine a geometrical structure of the tree diagram, the main processing unit 100 calculates positions on the tree diagram where the nodes corresponding to the respective components are to be arranged, on the basis of the number of components and the parent-child relationship between the components (block S203). Then, the main processing unit 100 calculates the weight of each component (block S204). The weight of a component that has no child component is given by the weight of the component itself. On the other hand, the weight of a component having child components is given by the sum of weights of all child components since the weight of the component itself is zero in usual cases.

Thereafter, based on the calculated weight relating to each component, the main processing unit 100 determines the thickness of a branch line connecting each node to its parent node on the tree diagram (block S205). Based on the positions of the nodes and the line widths of the branch lines, the main processing unit 100 creates the tree diagram as shown in FIG. 3 (block S206), and displays the tree diagram on the display via the display control unit 110 (block S207).

The characteristic quantity of each component, which is used in the process, is not limited to the above-mentioned weight or cost, and it may be various numerical attributes such as a chemical substance content indicative of the content of a specific chemical substance such as a controlled substance, a heat capacity, an assembly time, etc.

The process described with reference to the flow chart of FIG. 5 is carried out by the execution of the tree diagram creation program by the CPU in the main processing unit 100.

Figure 6:
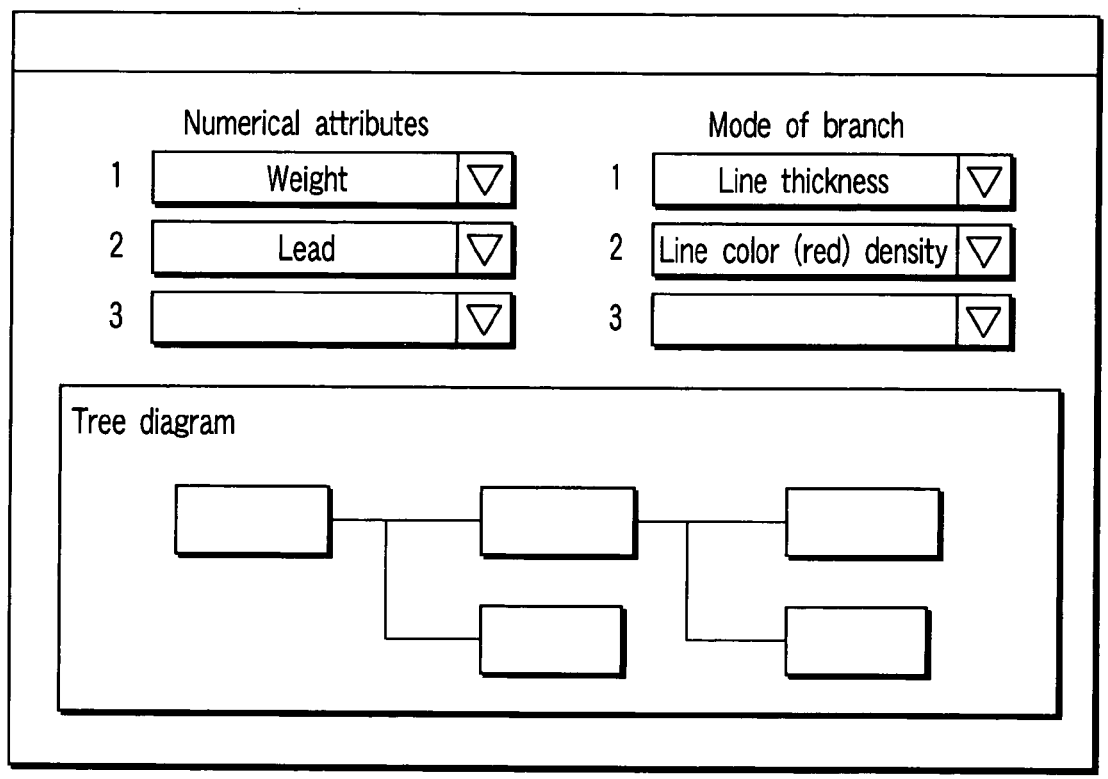
FIG. 6 shows an example of a user interface that is used in the information processing apparatus shown in FIG. 1.

FIG. 6 shows an example of a user interface (GUI) that designates the kinds of numerical attributes and the modes of branch lines, which are used for the tree diagram creation.

The mode of a branch line can be selected for each of the kinds of numerical attributes. In FIG. 6, it is assumed that "line thickness" is designated as the mode of the branch line corresponding to "weight", and "line color (e.g. red) density" is designated as the mode of the branch line corresponding to the content of "lead". In this case, the thickness of the branch line is determined by the weight, and the color density of the branch line is determined by the content of "lead". Thereby, it is also possible to simultaneously represent the contribution of each component in connection with two kinds of numerical attributes on the same tree diagram. The CPU in the main processing unit 100 executes the tree diagram creation program, thereby displaying the user interface (GUI) of FIG. 6 on the display of the display device 111.

As has been described above, according to the present embodiment, the hierarchical structure of components of a product and the degree of contribution of the components to the whole product can be graphically displayed at the same time on a tree diagram. In particular, since the mode of branch lines connecting nodes is automatically determined on the basis of the parent-child relationship between components and the characteristic quantities of the components, it is possible to show to the user which group of components influences the whole product, and to what degree such a group of components influences the whole product.

The tree diagram creation process of the present embodiment is all realized by a computer program (tree diagram creation program). Thus, simply by installing this computer program in an ordinary computer via a computer-readable storage medium, the same advantageous effects as in the present embodiment can easily be realized.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions.

The accompanying claims and their equivalents are intended to cover such forms or modifications as would fall within the scope and spirit of the inventions.

What is claimed is:

1. An information processing apparatus which displays a tree diagram that represents, in a tree form, a hierarchical structure of a plurality of components which constitute an electronic product, comprising:
    a memory unit which stores attribute information which indicates a characteristic quantity of each of the plurality of components, and parent-child relationship information which indicates a parent-child relationship between the plurality of components including at least one parent component and a child component the parent-child relationship is defined under a restrictive condition such that each child component of the plurality of components does not have two or more parent components;
    means for calculating, based on the parent-child relationship information, positions on the tree diagram where a plurality of nodes corresponding to the plurality of components are to be arranged;
    means for calculating, for each component of the plurality of components, a sum of the characteristic quantity of the component and the characteristic quantities of all child components associated with the component, based on the attribute information and the parent-child relationship information, wherein a sum calculated for a parent component having no child components is given b the characteristic quantity of the parent component itself, and a sum calculated for a parent component having child components is given the sum of the characteristic quantity of the parent component itself and the characteristic quantities of all of the child components;
    means for determining, for each of the nodes on the tree diagram, a mode of a branch line which is to connect the node to a parent node thereof, based on the sum calculated for the each of the components; and
    means for creating the tree diagram based on the calculated positions of the nodes and the determined mode of the branch line corresponding to each node.

2. The information processing apparatus according to claim 1, wherein the characteristic quantity of each of the plurality of components is a weight of the component.

3. The information, processing apparatus according to claim 1, wherein the characteristic quantity of each of the plurality of components is a quantity indicative of a cost of the component.

4. The information processing apparatus according to claim 1, wherein the characteristic quantity of each of the plurality of components is a chemical substance content of the component 5. The information processing apparatus according to claim 1, wherein the means for determining the mode of the branch line includes means for determining, for each of the nodes, a line width of the branch line which is to connect the node to the parent node thereof on the tree diagram, based on the sum calculated for each of the components.

6. The information processing apparatus according to claim 1, wherein the means for determining the mode of the branch line includes means for determining, for each of the nodes, a color of the branch line which is to connect the node to the parent node thereof on the tree diagram, based on the sum calculated for each of the components.

7. A program which is stored in a computer-readable medium and causes a computer to execute a process for displaying a tree diagram that represents, in a tree form, a hierarchical structure of a plurality of components which constitute an electronic product, comprising:
    causing the computer to read (i) attribute information, which indicates a characteristic quantity of each of the plurality of components, and (ii) parent-child relationship information, which indicates a parent-child relationship between the plurality of components, the plurality of components includes at least one parent component and a child component, the attribute information and the parent-child relationship information being stored in a memory unit and the parent-child relationship is defined under a restrictive condition such that each child component of the plurality of components does not have two or more parent components;
    causing the computer to execute a process for calculating, based on the parent-child relationship information, positions on the tree diagram where a plurality of nodes corresponding to the plurality of components arc to be arranged;
    causing the computer to execute a process for calculating, for each of the components, a sum of the characteristic quantity of the component and the characteristic quantities of all child components belonging to the component, based on the attribute information and the parent-child relationship information wherein a sum calculated for a parent component having no child components is given by the characteristic quantity of the parent component itself, and a sum calculated for a parent component having child components is given the sum of the characteristic quantity of the parent component itself and the characteristic quantities of all of the child components;
    causing the computer to execute a process for determining, for each of the nodes on the tree diagram, a mode of a branch line which is to connect the node to a parent node thereof, based on the sum calculated for each of the components; and causing the computer to execute a process for creating the tree diagram based on the calculated positions of the nodes and the determined mode of the branch line corresponding to each node.

8. The program according to claim 7, wherein the characteristic quantity of each of the plurality of components is a weight of the component.

9. The program according to claim 7, wherein the characteristic quantity of each of the plurality of components is a quantity indicative of a cost of the component.

10. The program according to claim 7, wherein the characteristic quantity of each of the plurality of components is a chemical substance content of the component.

11. The program according to claim 7, wherein the process for determining the mode of the branch line includes a process for determining, for each of the nodes, a line width of the branch line which is to connect the node to the parent node thereof on the tree diagram, based on the sum calculated for each of the components.

12. The program according to claim 7, wherein the process for determining the mode of the branch line includes a process for determining, for each of the nodes, a color of the branch line which is to connect the node to the parent node thereof on the tree diagram, based on the sum calculated for each of the components.

13. An information processing apparatus which displays a tree diagram that represents, in a tree form, a hierarchical structure of a plurality of hardware components which constitute an electronic product, comprising:

a memory unit to store (i) attribute information that indicates a characteristic quantity of each of the plurality of components and (ii) parent-child relationship information that indicates a parent-child relationship between the plurality of components, the plurality of components include a parent component and at least one child component associated with the parent component, and the parent-child relationship is defined under a restrictive condition that each of the at least one child component does not have a plurality of parent components;

means for calculating positions on the tree diagram where a plurality of nodes corresponding to the plurality of components are to be arranged;

means for calculating, for each of the plurality of components, a sum of (i) the characteristic quantity of the component and characteristic quantities of all child components of the component and (ii) the parent-child relationship information;

means for determining, for each of the nodes on the tree diagram, a mode of a branch line to connect the node to a parent node thereof based on the sum calculated for the each of the components; and means for creating the tree diagram based on the calculated positions of the nodes and the determined mode of the branch line corresponding to each node.

14. The information processing apparatus according to claim 13, wherein the means for calculating the sum calculates the sum for a first parent component having no child components based on the characteristic quantity of the first parent component itself, and the sum calculated for a second parent component having child components is given the sum of the characteristic quantity of the second parent component and the characteristic quantities of all child components of the second parent component.

15. The information processing apparatus according to claim 13, wherein the characteristic quantity of each of the plurality of components is a weight of the component.

16. The information processing apparatus according to claim 13, wherein the characteristic quantity of each of the plurality of components is a quantity indicative of a cost of the component.

17. The information processing apparatus according to claim 13, wherein the characteristic quantity of each of the plurality of components is a chemical substance content of the component.

18. The information processing apparatus according to claim 13, wherein the means for determining the mode of the branch line includes means for determining, for each of the nodes, a line width of the branch line which is to connect the node to the parent node thereof on the tree diagram, based on the sum calculated for each of the components.

19. The information processing apparatus according to claim 13, wherein the means for determining the mode of the branch line includes means for determining, for each of the nodes, a color of the branch line which is to connect the node to the parent node thereof on the tree diagram, based on the sum calculated for each of the components.

* * * * *